US008066605B2

(12) United States Patent
Kingston et al.

(10) Patent No.: US 8,066,605 B2
(45) Date of Patent: Nov. 29, 2011

(54) PLANET TRANSMISSION, DRIVE DEVICE COMPRISING THE PLANET TRANSMISSION AND VEHICLE COMPRISING THE DRIVE DEVICE

(75) Inventors: Tim Kingston, Eskilstuna (SE); Mats Åkerblom, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 856 days.

(21) Appl. No.: 11/994,340

(22) PCT Filed: Jul. 1, 2005

(86) PCT No.: PCT/SE2005/001101
§ 371 (c)(1),
(2), (4) Date: May 26, 2008

(87) PCT Pub. No.: WO2007/004937
PCT Pub. Date: Jan. 11, 2007

(65) Prior Publication Data
US 2008/0268998 A1    Oct. 30, 2008

(51) Int. Cl.
*F16H 57/04* (2010.01)
(52) U.S. Cl. ........ 475/161; 475/323; 475/328; 475/900; 180/372
(58) Field of Classification Search .................. 475/161, 475/323, 328, 900; 180/372; 192/221.1, 192/70.19, 48.603, 70.12
See application file for complete search history.

(56) References Cited

U.S. PATENT DOCUMENTS

| | | | | |
|---|---|---|---|---|
| 3,774,475 | A | * | 11/1973 | Meysenburg et al. ........ 475/158 |
| 4,566,563 | A | | 1/1986 | Chauveau et al. |
| 4,790,213 | A | * | 12/1988 | Lasoen ......................... 475/328 |
| 4,961,485 | A | * | 10/1990 | Huff et al. .................. 192/221.1 |
| 5,147,255 | A | * | 9/1992 | Strehler et al. ................ 475/311 |
| 5,197,929 | A | | 3/1993 | Scheiber et al. |
| 5,460,578 | A | | 10/1995 | Giuriati et al. |
| 5,480,361 | A | * | 1/1996 | Murakami et al. ............ 475/328 |
| 5,525,115 | A | * | 6/1996 | Vanzini ......................... 475/146 |

(Continued)

FOREIGN PATENT DOCUMENTS
DE    10217483 A1    11/2003
(Continued)

OTHER PUBLICATIONS

European Search Report for corresponding European App. EP 05 75 7075.

(Continued)

*Primary Examiner* — Sherry Estremsky
(74) *Attorney, Agent, or Firm* — WRB-IP LLP

(57) ABSTRACT

A planetary transmission includes a sun gear, which constitutes an input drive to the planetary transmission, a ring gear arranged around the sun gear, and a planet carrier which is designed to rotate and which carries at least one planet wheel, which planet wheel meshes with the sun gear and the ring gear. The planet carrier constitutes an output drive from the planetary transmission. The planetary transmission further includes a wet disk brake, a first set of brake disks in the brake being rotationally locked to the planet carrier and thereby in operation rotating at the rotational speed of the planet carrier. The planetary transmission further comprises an arrangement for circulation of a cooling fluid through the brake which is rotationally locked to the sun gear and thereby in operation rotates at the rotational speed of the sun gear.

17 Claims, 5 Drawing Sheets

U.S. PATENT DOCUMENTS

| | | | |
|---|---|---|---|
| 6,090,006 A * | 7/2000 | Kingston | 475/323 |
| 6,817,963 B1 * | 11/2004 | Solka | 475/323 |
| 7,025,704 B2 * | 4/2006 | Yasuda et al. | 475/323 |
| 2004/0254044 A1 * | 12/2004 | Oberstarr | 475/323 |
| 2007/0105686 A1 * | 5/2007 | Andersson et al. | 475/323 |

FOREIGN PATENT DOCUMENTS

| | | |
|---|---|---|
| EP | 0084732 A | 8/1983 |
| JP | 61223342 A | 10/1986 |
| WO | 9846444 A | 10/1998 |
| WO | 03039900 A | 5/2003 |
| WO | 2007001220 A | 1/2007 |

OTHER PUBLICATIONS

International Search Report for corresponding International Applicaton PCT/SE2005/001101.

International Preliminary Report on Patentability for corresponding International Applicaton PCT/SE2005/001101.

* cited by examiner

PLANET TRANSMISSION, DRIVE DEVICE COMPRISING THE PLANET TRANSMISSION AND VEHICLE COMPRISING THE DRIVE DEVICE

BACKGROUND AND SUMMARY

The present invention relates to a planetary-transmission comprising a sun gear, which constitutes an input drive means to the planetary transmission, a ring gear arranged around the sun gear, a planet carrier which is designed to rotate and which carries at least one planet wheel, which planet wheel meshes with the sun gear and the ring gear. The planet carrier constitutes an output drive means from the planetary transmission. The planetary transmission further comprises a wet disk brake, a first set of brake disks in the brake being rotationally locked to the planet carrier and thereby in operation rotating at the rotational speed of the planet carrier. The invention further relates to a drive device comprising such a planetary transmission.

The invention relates primarily to the field of work machinery or work vehicles, such as wheel loaders and dumpers (frame-steered vehicles). The invention could also be utilized for other types of work vehicle, such as backhoes (excavator loaders), and excavators. The invention also has applications in other types of heavy, non-commercial vehicles, such as trucks.

The drive device therefore comprises the planetary transmission and forms a so-called final drive, or hub-mounted reduction gear. The wheel is then arranged rotationally locked on a hub and the planetary transmission is connected between a drive shaft and the hub. The drive shaft is driven by an angular gear, or center gear, which is in turn driven by the vehicle engine by way of a transmission system.

Arranging a planetary transmission on each drive wheel in this way produces a reduction in rotational speed from the drive shaft to the hub and an increase in torque from the drive shaft to the hub.

Since the planet carrier is rotationally locked to the wheel hub the first set of brake disks will in operation rotate at the speed of the wheel. Such a brake affords a high degree of precision and sensitivity in braking.

Rotationally locking a first set of brake disks to a planet carrier in such a planetary transmission, as disclosed by WO 99/03699, for example, is already known. The brake disks are then connected via splines on a radially outer surface of the planet carrier.

WO 04/104436 describes a planetary transmission in which multiple planet wheel journals are joined by a bolted connection to a common, annular carrier, which has radially outer splines for the first set of brake disks.

It is desirable to provide a planetary transmission with an integral brake, which affords a good circulation of cooling fluid to the brake. The invention is also intended to minimize the number of parts and/or to provide a design construction that is as simple and hence as cost-effective as possible. A further intention is to achieve the most compact solution possible in an axial direction.

According to an aspect of the invention, a planetary transmission comprises a sun gear, which constitutes an input drive means to the planetary transmission, a ring gear arranged around the sun gear, a planet carrier which is designed to rotate and which carries at least one planet wheel, which planet wheel meshes with the sun gear and the ring gear, the planet carrier constituting an output drive means from the planetary transmission. The planetary transmission further comprises a wet disk brake, a first set of brake disks in the brake being rotationally locked to the planet carrier and thereby in operation rotating at the rotational speed of the planet carrier. The brake further comprises a means for circulation of a cooling fluid through the brake, the brake circulation means being rotationally locked to the sun gear and thereby in operation rotating at the rotational speed of the sun gear. The fact that the sun gear rotates substantially faster than the planet carrier means that an efficient cooling of the brake is achieved. The cooling fluid is forced radially outwards by the brake circulation means.

According to a preferred embodiment said means for circulation of the cooling fluid is arranged, at least substantially, radially directly inside the brake in order to force the cooling fluid outwards to the brake as the cooling fluid rotates under the effect of the centrifugal force. In other words, viewed in a radial direction there is an overlap between the position of said means for circulation of the cooling fluid and the actual brake.

According to a further development of the preceding embodiment said means for circulation of the cooling fluid comprises a plurality of elements for forcing the cooling fluid, and the cooling fluid forcing elements and the brake disks in the first set are arranged so that they alternate in an axial direction. In this way the cooling fluid is forced in between the opposing brake surfaces of the brake designed for engagement with one another. Said means for circulation of the cooling fluid is preferably disk-shaped.

According to a further development of the preceding embodiment said means for circulation of the cooling fluid comprises a third set of brake disks. This creates the prerequisites for a further braking effect. The third set of brake disks is arranged radially inside the engagement surfaces between the first set and a second set of brake disks in the brake. The third set of brake disks is preferably designed to interact with the first set of brake disks.

According to a further development of the preceding embodiment the opposing surfaces of the first and third set of brake disks, which are designed to interact with one another, form a part of a parking brake. The service brake function has thereby been combined with a parking brake function in a compact, space-saving manner. The parking brake preferably comprises a separate brake piston that is suitably spring-loaded.

According to a further preferred embodiment the brake disks in the first set comprise means for rotationally locking the brake disks directly to the planet wheel journal. This creates the prerequisites for a brake having a smaller overall outside diameter than when the brake disks are seated radially outside the planet carrier. In order to be able to carry not only the planet wheel but also a plurality of brake disks, the planet wheel journals have been lengthened in comparison to hitherto known planet wheel journals.

According to a further development of the preceding embodiment each of the brake disks in the first set comprises at least one hole, in which said planet wheel journal is received. This connection entails less machining than when a splined connection is used.

BRIEF DESCRIPTION OF THE DRAWINGS

The invention will be described in more detail below with reference to the embodiments shown in the drawings attached, in which.

DETAILED DESCRIPTION

Figure 1:
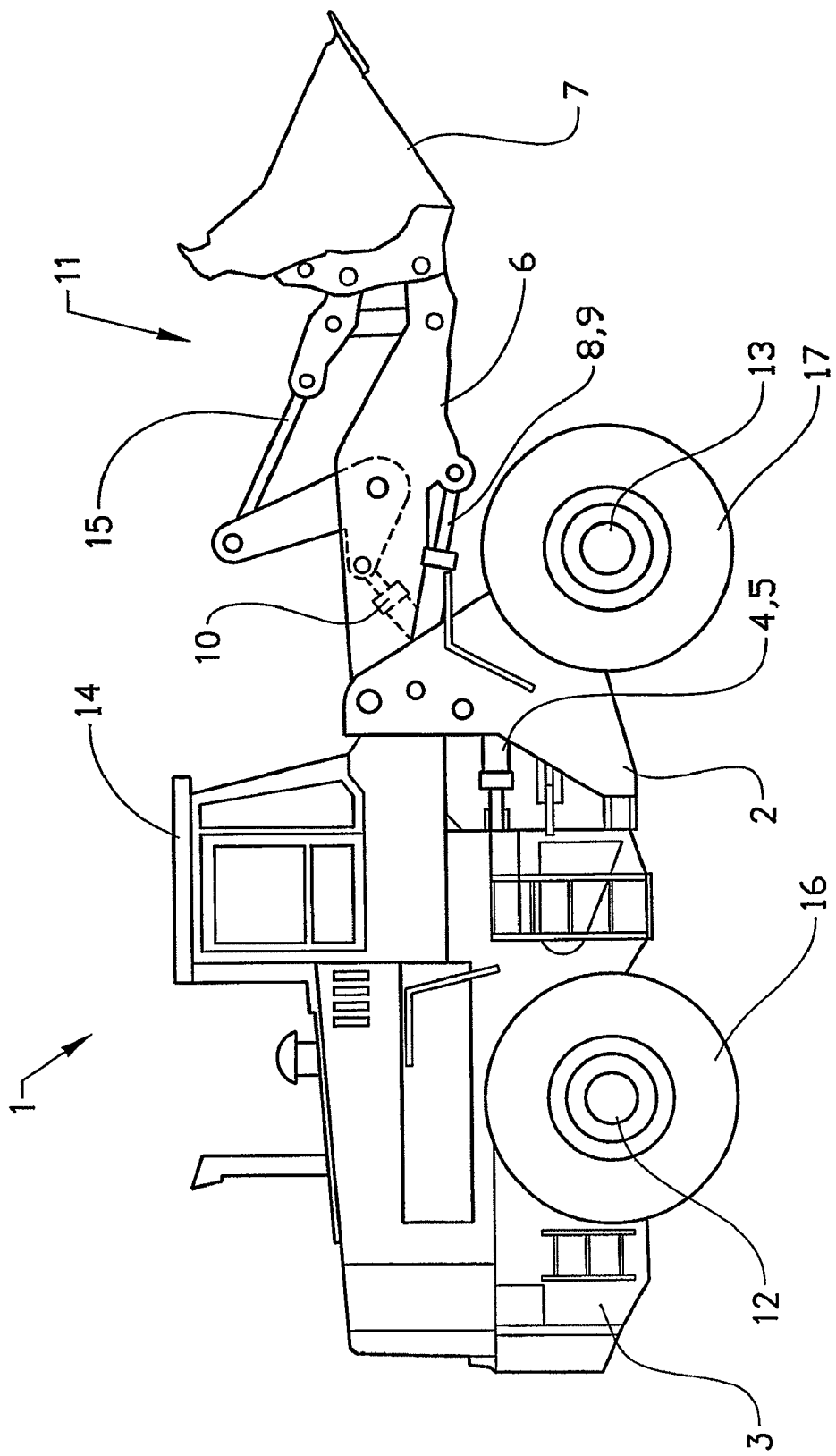
FIG. 1 shows a side view of a wheel loader.

FIG. 1 shows a wheel loader 1. The body of the wheel loader 1 comprises a front section 2 and a rear section 3, which each have a pair of drive shafts 12, 13 with wheels 16, 17. The rear vehicle section 3 comprises a cab 14. The vehicle sections 2, 3 are designed to rotate in relation to one another about a vertical axis with the aid of two first actuators in the form of hydraulic cylinders 4, 5 arranged between the two sections. The hydraulic cylinders 4, 5 are arranged on either side of a horizontal center line through the vehicle for the purpose of steering the vehicle.

The wheel loader 1 comprises a device 11 for moving objects or material. The device 11 comprises a lifting arm unit 6 and an implement 7 in the form of a shovel, which is arranged on the load arm unit 6. A first end of the load arm unit 6 is rotatably connected to the front vehicle section 2. The implement 7 is rotatably connected to a second end of the load arm unit 6.

The load arm unit 6 can be raised and lowered in relation to the front section 2 of the vehicle by means of two other actuators in the form of two hydraulic cylinders 8, 9, which are each connected by one end to the front vehicle section 2 and by the other end to the load arm unit 6. The shovel 7 can be tilted in relation to the load arm unit 6 by means of a third actuator in the form of a hydraulic cylinder 10, which is connected by a first end to the front vehicle section 2 and by its other end to the shovel 7 via a linkage arm system 15.

Figure 2:
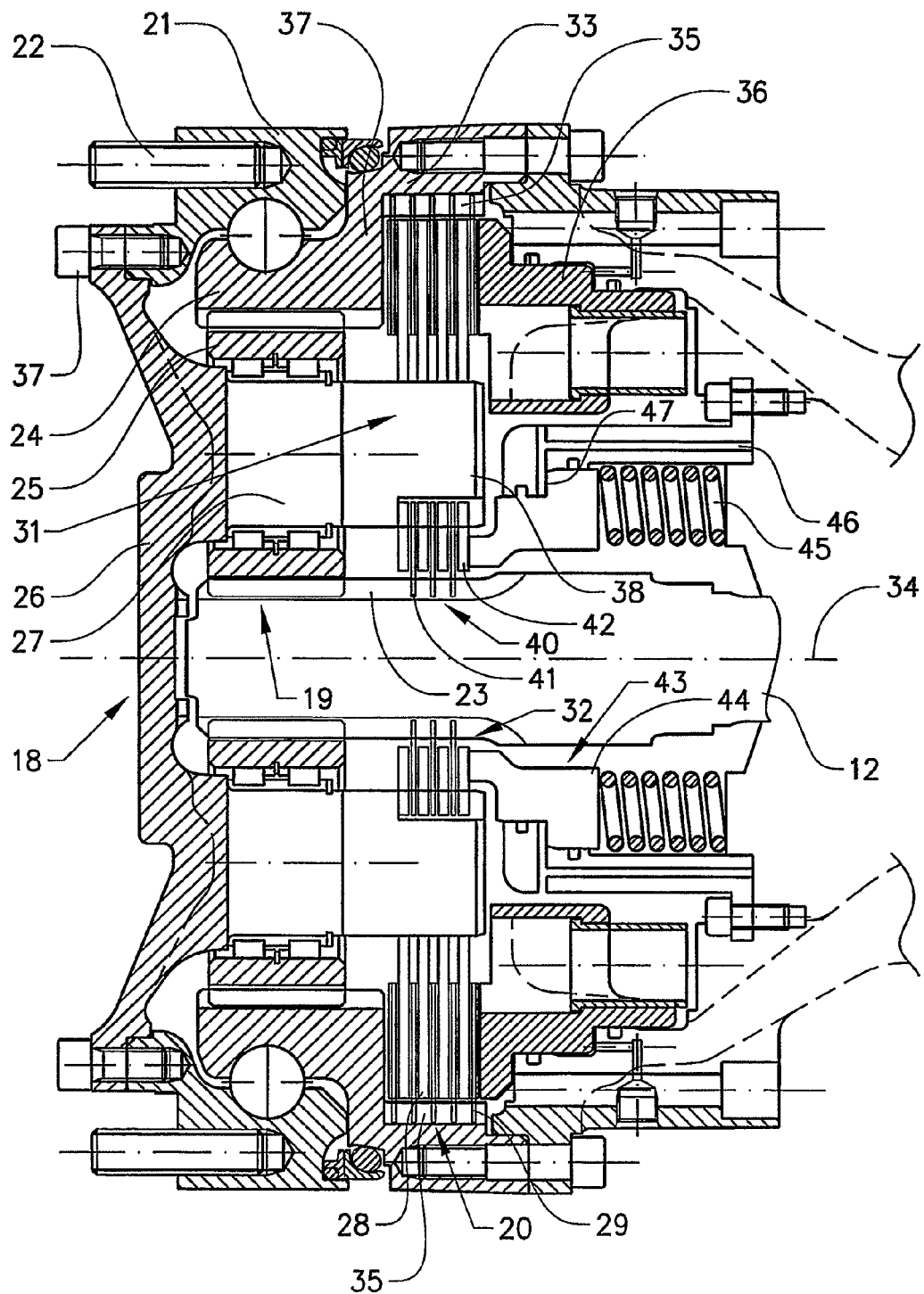
FIG. 2 shows a cut-away cross-sectional view of a planetary transmission with integral brake in a device for driving a wheel of a vehicle.
Figure 3:
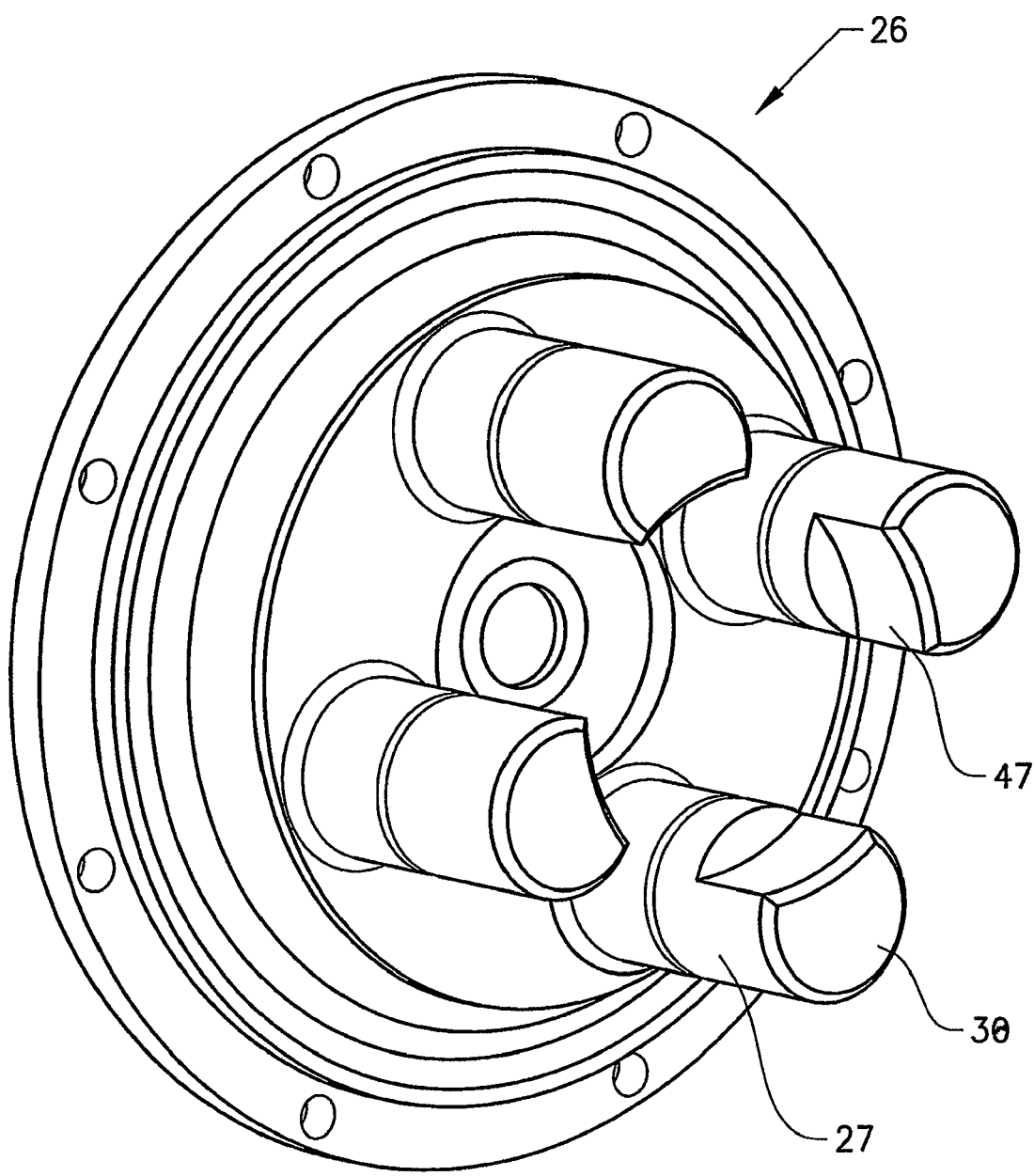
FIG. 3 shows a perspective view of a planet carrier forming part of the planetary transmission in FIG. 2.

FIG. 2 shows a drive device 18 for driving one of the wheels 16, 17 of the wheel loader. The drive device 18 comprises a planetary transmission 19 with an integral brake 20. The drive device 18 forms a so-called final drive, or hub-mounted reduction gear. The wheel 16, 17 is intended to be arranged rotationally locked on a hub 21 by means of wheel bolts 22. The planetary transmission 19 is connected between a drive shaft 12 and the hub 21. The drive shaft 12 is driven by an angular gear, or center gear, which is in turn driven by the vehicle engine by way of a transmission system (not shown).

The planetary transmission 19 comprises a sun gear 23 which is rotationally locked to the drive shaft 12 and which is designed to drive the planetary transmission.

The planetary transmission 19 further comprises a fixed ring gear 24 and multiple planet wheels 25 which are arranged between the sun gear 23 and the ring gear 24 and mesh with them.

The planetary transmission 19 further comprises a planet carrier 26 having multiple projecting journals 27, each for supporting one of said planet wheels 25. The planet carrier 26 comprises a rotationally symmetrical body, which is rotationally locked to the hub 21. The planet wheel journals 27 are here integrally formed with the body. The planet wheel journals 27 are arranged equidistant from one another in the circumferential direction of the planet carrier. In the exemplary embodiment shown the planet carrier 26 comprises four journals 27, but the number of journals may also be fewer or more than four. Each of the journals 27 has a circular cross-sectional shape and an indentation 47, or beveling, at its free end 38, which faces radially inwards. The indentations 47 are of such a shape that a circular inner space is defined between the journals 27.

Figure 4:
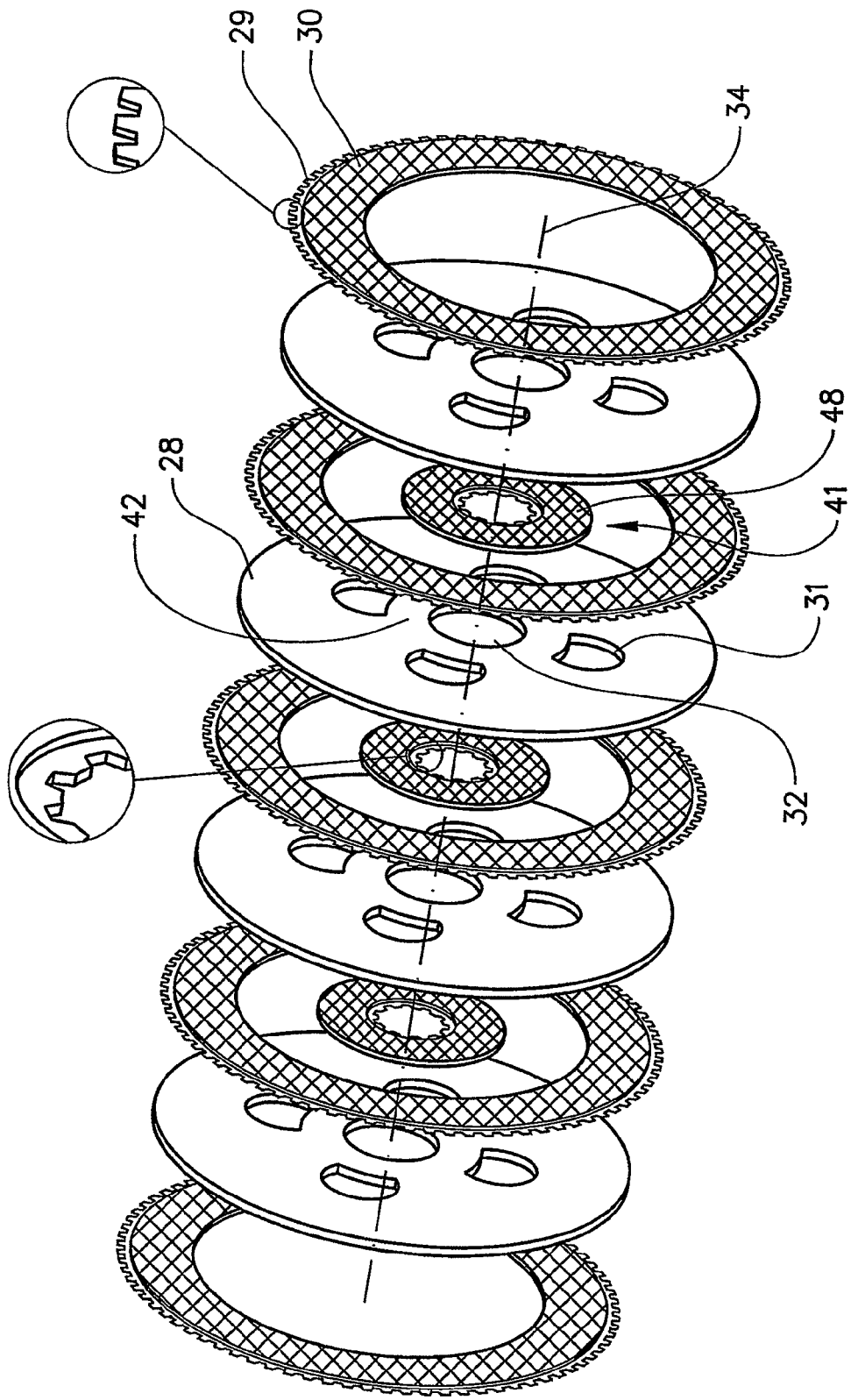
FIG. 4 shows an exploded view of a set of brake disks forming part of the brake in FIG. 2.

The disk brake 20 of the planetary transmission 19 is a wet brake. The brake 20 comprises a set of brake disks, which comprises a first set of brake disks in the form of rotor disks 28 and a second set of brake disks in the form of stator disks 29, see FIG. 4. The term "rotor disks" relates to the disks which rotate in operation and the term "stator disks" relates to the disks which are fixed, that is to say non-rotating in operation. Every other brake disk comprises a stator disk and every second disk comprises a rotor disk. The brake disks are furthermore displaceable in relation to one another along a central axis 34 for engagement and disengagement with one another.

The stator and rotor disks 28, 29 are preferably of a metallic material, such as steel, preferably a normalized, low-alloy carbon steel. Alternatively the stator disks and the rotor disks 28, 29 may be of some other material, such as plastics or carbon fibers.

Each of the rotor disks 28 comprises at least one hole 31 for receiving said journal 27 of the planet carrier 26 for rotationally locked connection to the planet carrier. These holes 31 for the planet carrier journals 27 are arranged at a radial distance from the intended axis of rotation 34 of the rotor disk 28, which is defined by the geometric center of the brake disk. According to the preferred embodiment multiple holes 31 are arranged equidistant from one another in the circumferential direction of the rotor disk, each hole being intended to receive a planet carrier journal. Said holes 31 for the planet carrier journal 27 extend through the rotor disk.

Said holes 31 have a shape corresponding to the cross-sectional shape of the planet carrier journal 27. Said holes 31 in this case have a lunate shape in order to match the cross-sectional shape of the free end 38 of the journal 27.

Each of the rotor disks 28 comprises a central through-opening 32 for receiving the drive shaft 12. The central hole 32 has an inside diameter larger than the outside diameter of the drive shaft 12, so that the drive shaft can rotate at a greater speed than the rotor disks.

The rotor disks 28 are furthermore displaceable along the planet wheel journals 27 in the axial direction 34 of the planetary transmission. The stator disks 29 are arranged rotationally locked in a fixed housing 33, in the form of an axle casing. The stator disks 29 are arranged so that they are displaceable in the same direction in the housing 33, that is to say in a direction parallel to the axis of rotation 34 of the planetary transmission. The housing 33 accordingly comprises radially inner means 35 for engagement with the stator disks 29, so that the rotation of the disks is counteracted and so that the brake disks can be displaced parallel to their central axis 34. This means of engagement 35 may comprise, for example, a toothed structure in the internal surface of the housing 33 and of a correspondingly shaped toothed structure on the radially outer surface of the brake disks 29.

There is a layer 30 of coating material on at least one of the sides of the stator disk for engagement with the adjacent rotor disk 28. There are preferably layers 30 of coating material on both sides of each of the stator disks 29. The rotor disks 28 on the other hand are devoid of layers of coating material on their sides. The coating material here is of paper, but it may alternatively be of some other material, such as plastics. The layer 30 of coating material preferably has a pattern, see FIG. 4, in order to permit a cooling flow between the stator disks and the rotor disks 28, 29 when the brake is activated.

The surface of the rotor disks 28 that is intended to come into contact with the layer of coating material 30 on the stator disks 29 when braking is preferably treated and has a certain surface fineness.

The brake 2 comprises a brake piston 36, designed on activation to compress the brake disks 28, 29 against a counter-pressure plate 37. The counter-pressure plate 37 in this case forms part of the fixed housing 33.

The transmission of rotation and torque between the planet carrier 26 and the rotor disk 28 therefore occurs between the relatively long planet wheel journals 27 and the holes 31 in the rotor disks 28.

The fact that the planet carrier 26 is rotationally locked to the wheel hub 21 by a bolted connection 37 means that they rotate with the planet wheel journals 27 rotationally locked to the rotor disks 28 at the same speed as the wheel.

The brake disks 28, 29 are arranged closer to the free end 38 of the planet wheel journal than is the planet wheel 25.

The planetary transmission further comprises a means 40 for circulation of a cooling fluid through the brake 20. This means 40 for circulation of the cooling fluid is rotationally locked to the sun gear 23 and thereby in operation rotates at the rotational speed of the sun gear.

Said means 40 for circulation of the cooling fluid is arranged, at least substantially, radially directly inside the brake 20 in order to force the cooling fluid outwards to the brake as the cooling fluid rotates under the effect of the centrifugal force.

Said means 40 for circulation of the cooling fluid comprises a plurality of disk-shaped elements 41 for forcing the cooling fluid. The elements 41 and the brake disks 28 in the first set are arranged so that they alternate in an axial direction. The radial extent of the brake disks 28 in the first set is such that they overlap the elements 41 viewed in an axial direction 34.

The cooling fluid forcing elements 41 are furthermore displaceable along the drive shaft 12 in the axial direction 34 of the planetary transmission. Radially inside, therefore, the elements 41 comprise a toothed structure for engagement with the sun gear 23 so that the elements 41 are rotationally locked to the sun gear.

Said means 40 for circulation of the cooling fluid further comprises a structure for influencing the cooling fluid in order to promote the circulation. This structure may be represented, for example, by a pattern in form of a perforated surface, a grooved structure or the like on the lateral surfaces of the cooling fluid forcing elements 41.

More specifically, said means 40 for circulation of the cooling fluid comprises a third set of brake disks 41. The brake disks 41 in the third set are arranged radially inside the engagement surfaces for the first and second set of brake disks 28, 29. The third set of brake disks 41 is designed to interact with a radially inner surface 42 of the first set of brake disks 28.

There is a layer 48 of coating material on at least one of the sides of the brake disk 41 for engagement with the adjacent brake disk 28. There are preferably layers 48 of coating material on both sides of each of the rotor disks 41. The coating material here is of paper, but it may alternatively be of some other material, such as plastics. The layer 48 of coating material preferably has a pattern, see FIG. 4, in order to improve the circulation of a cooling flow through the brake and to permit a cooling flow between the disks 28, 41 when the brake is activated.

The surface of the rotor disks 28 in the first set that is intended to come into contact with the layer of coating material 48 on the rotor disks 41 when braking is preferably treated and has a certain surface fineness.

The opposing surfaces of the first and third set of brake disks 28, 41 which are designed to interact with one another, furthermore form a part of a parking brake 43. The parking brake 43 comprises a separate brake piston 44. The brake piston 44 is spring-loaded, see spring 45. A line 46 for a brake fluid opens out opposite a surface 47 of the piston in such a way that the spring 45 is compressed when the piston is pressurized. The parking brake 43 is therefore in a passive state when the piston is pressurized. When the pressurization is cancelled the spring 45 will compress the set of brake disks in the parking brake 43, thereby applying the parking brake.

Figure 5:
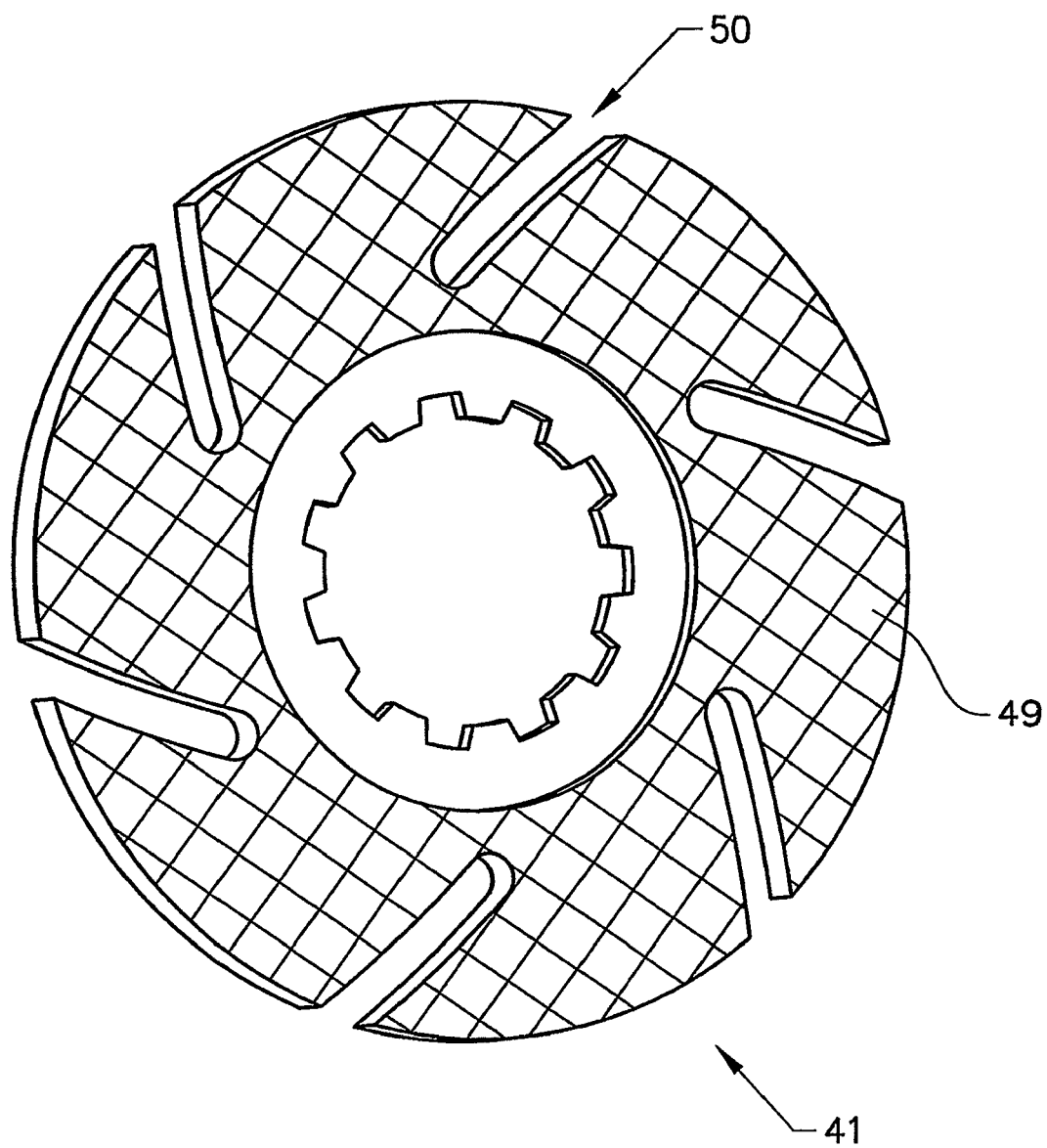
FIG. 5 shows a perspective view of an alternative embodiment of a means for forcing a cooling fluid.

FIG. 5 shows an alternative embodiment of said element 41 for circulation of the cooling fluid. The element 41 comprises a structure for influencing the cooling fluid with the object of promoting the circulation. This structure comprises a plurality of blades 49, which are defined by grooves 50 in the circumferential direction of the elements 41. The structure also comprises a pattern on its flat sides. In this case the pattern is formed by a layer of brake lining.

The invention must not be regarded as being limited to the exemplary embodiments described above, a number of further variants and modifications being feasible without departing from the scope of the following patent claims.

It is feasible, for example, to eliminate the parking brake 43 and to utilize the available braking effect between the first and third set of brake disks 28, 41 in order to enhance the braking effect of the brake 20, that is to say to boost the service brake. In such a case the brake piston 44 is designed in a corresponding way to the piston 36 for application of the brake.

Said element 41 for circulation of the cooling fluid, for example, could have just blades according to the embodiment as shown in FIG. 5 (that is to say without any layer of a brake lining).

The invention claimed is:

1. A planetary transmission comprising:
   a sun gear, the sun gear forming an input drive to the planetary transmission,
   a ring gear arranged around the sun gear,
   a planet carrier, the planet carrier being adapted to rotate and carrying at least one planet wheel, which planet wheel meshes with the sun gear and the ring gear, the planet carrier forming an output drive from the planetary transmission, and
   a wet disk brake comprising a first set of brake disks, the first set of brake disks being rotationally locked to the planet carrier and thereby in operation rotating at a rotational speed of the planet carrier, and a second set of brake disks, the second set of brake disks being displaceably arranged in a fixed housing, the first and second brake disks being arranged so that every other brake disk belongs to the first set of brake disks and every second brake disk belongs to the second set of brake disks, and
   means for circulation of cooling fluid through the brake rotationally locked to the sun gear so that it, in operation, rotates at a rotational speed of the sun gear.

2. The planetary transmission as claimed in claim 1, wherein the means for circulation of cooling fluid is arranged, at least substantially, radially directly inside the brake such that cooling fluid is forced outwards to the brake as a result of centrifugal force.

3. The planetary transmission as claimed in claim 1, wherein the means for circulation of cooling fluid comprises a plurality of elements for forcing the cooling fluid and the cooling fluid-forcing elements and the brake disks in the first set of brake disks are arranged so that they alternate in an axial direction.

4. The planetary transmission as claimed in claim 1, wherein the means for circulation of cooling fluid comprises a structure for influencing the cooling fluid.

5. The planetary transmission as claimed in a claim 1, wherein the means for circulation of cooling fluid is disk-shaped.

6. The planetary transmission as claimed in claim 1, wherein the means for circulation of cooling fluid comprises a third set of brake disks.

7. The planetary transmission as claimed in claim 6, wherein the third set of brake disks is adapted to interact with the first set of brake disks.

8. The planetary transmission as claimed in claim 7, wherein opposing surfaces of the first and third set of brake disks, which are adapted to interact with one another, form a part of a parking brake.

9. The planetary transmission as claimed in claim 8, wherein the parking brake comprises a separate brake piston.

10. The planetary transmission as claimed in claim 1, wherein the planet carrier comprises at least one journal for supporting at least one planet wheel, and the brake disks in the first set comprise means for rotationally locking the brake disks directly to the planet wheel journal.

11. The planetary transmission as claimed in claim 10, wherein each of the brake disks in the first set comprises at least one hole, in which the planet wheel journal is received.

12. The planetary transmission as claimed in claim 10, wherein the brake disks in the first set of brake disks are displaceable along the planet wheel journal in an axial direction thereof.

13. The planetary transmission as claimed in claim 1, wherein the sun gear is rotationally locked on a drive shaft, and each of the brake disks in the first set of brake disks comprises a central through-opening through which the drive shaft extends.

14. The planetary transmission as claimed in claim 1, wherein the ring gear is fixed.

15. A device for driving a wheel of a vehicle, the device comprising a transmission as claimed in claim 1.

16. The device as claimed in claim 15, wherein the planet carrier is rotationally locked to a wheel hub for reducing rotational speed from a drive shaft to the wheel hub.

17. A vehicle, comprising at least one wheel, and a device as claimed in claim 16 on at least one wheel.

* * * * *